US012798442B2

(12) United States Patent
Lu et al.

(10) Patent No.: US 12,798,442 B2
(45) Date of Patent: Nov. 17, 2026

(54) POWER SUPPLY METHOD AND SYSTEM FOR HYDROGEN FUEL CELL STACK, AND HYDROGEN POWERED MOTORCYCLE AND DRIVING METHOD AND SYSTEM THEREOF

(71) Applicant: YOUON TECHNOLOGY CO., LTD., Jiangsu (CN)

(72) Inventors: Minmin Lu, Jiangsu (CN); Cheng Qian, Jiangsu (CN); Weijie Ze, Jiangsu (CN); Qian Ma, Jiangsu (CN)

(73) Assignee: YOUON TECHNOLOGY CO., LTD., Jiangsu (CN)

( * ) Notice: Subject to any disclaimer, the term of this patent is extended or adjusted under 35 U.S.C. 154(b) by 1177 days.

(21) Appl. No.: 17/789,804

(22) PCT Filed: Dec. 24, 2020

(86) PCT No.: PCT/CN2020/139007
§ 371 (c)(1),
(2) Date: Jun. 29, 2022

(87) PCT Pub. No.: WO2021/136061
PCT Pub. Date: Jul. 8, 2021

(65) Prior Publication Data

US 2023/0038076 A1 Feb. 9, 2023

(30) Foreign Application Priority Data

Dec. 31, 2019 (CN) ......................... 201911411024.5

(51) Int. Cl.
*B60L 58/40* (2019.01)
*B60L 3/00* (2019.01)
(Continued)

(52) U.S. Cl.
CPC ............. *B60L 58/40* (2019.02); *B60L 3/0046* (2013.01); *B60L 3/0053* (2013.01); *B60L 50/72* (2019.02);
(Continued)

(58) Field of Classification Search
CPC .......... B60L 58/10; B60L 58/30; B60L 58/40; H01M 10/46; H01M 16/006; H01M 2220/20; H01M 2250/20
See application file for complete search history.

(56) References Cited

U.S. PATENT DOCUMENTS

2010/0273080 A1* 10/2010 Noguchi ............... H01M 10/44 429/442
2019/0002279 A1* 1/2019 Dwyer ............. H01M 8/04559

FOREIGN PATENT DOCUMENTS

JP 2011192594 * 9/2011 ............. H01M 8/04

OTHER PUBLICATIONS

Machine Translation of Ogawa (Year: 2011).*

* cited by examiner

*Primary Examiner* — Matthew T Martin
*Assistant Examiner* — Ankith R Sripathi
(74) *Attorney, Agent, or Firm* — Birchwood IP

(57) ABSTRACT

The present invention provides a power supply method and system for a hydrogen fuel cell stack, and a hydrogen powered motorcycle and a driving method and system thereof, the power supply method includes: a control chip detecting the operating states of the hydrogen fuel cell stack and the lithium battery pack; when the hydrogen fuel cell stack and the lithium battery pack are free of faults, obtaining the output voltage of the lithium battery pack; when the output voltage is lower than the charge-on threshold, the hydrogen fuel cell stack powering the lithium battery pack; when the output voltage is higher than the charge-stop
(Continued)

threshold, disconnecting the circuit of the hydrogen fuel cell stack powering the lithium battery pack, when the output voltage is more than or equal to the charge-on threshold and less than or equal to the charge-stop threshold, the circuit of the hydrogen fuel cell stack remaining to power the lithium battery pack; and when the output voltage is higher than the charge-stop threshold, disconnecting the circuit of the hydrogen fuel cell stack powering the lithium battery pack. The aforementioned technical solution uses hydrogen energy as the electrical energy powering the motorcycle as much as possible under the protection of the hydrogen fuel cell stack.

3 Claims, 5 Drawing Sheets

(51) Int. Cl.

| | |
|---|---|
| ***B60L 50/72*** | (2019.01) |
| ***B60L 58/10*** | (2019.01) |
| ***B60L 58/30*** | (2019.01) |
| ***B62J 43/16*** | (2020.01) |
| ***H01M 8/04858*** | (2016.01) |
| ***H01M 10/46*** | (2006.01) |
| ***H01M 10/48*** | (2006.01) |
| ***H01M 16/00*** | (2006.01) |

(52) U.S. Cl.

CPC ............... *B60L 58/10* (2019.02); *B60L 58/30* (2019.02); *B62J 43/16* (2020.02); *H01M 8/04902* (2013.01); *H01M 10/46* (2013.01); *H01M 10/48* (2013.01); *H01M 16/006* (2013.01); *H01M 2220/20* (2013.01); *H01M 2250/20* (2013.01)

POWER SUPPLY METHOD AND SYSTEM FOR HYDROGEN FUEL CELL STACK, AND HYDROGEN POWERED MOTORCYCLE AND DRIVING METHOD AND SYSTEM THEREOF

BACKGROUND OF THE INVENTION

The invention relates to the field of energy management, in particular to a power supply method and system for a hydrogen fuel cell stack, and a hydrogen powered motorcycle and a driving method and system thereof.

Hydrogen fuel cells are a device, which utilizes hydrogen as fuel to generate electricity through a chemical reaction with oxygen discharging water only as a by-product. Therefore, as the hydrogen fuel cells have been rapidly developed in the field of transportation equipment, they are being utilized as an electrical energy source of nor-motorized vehicles and motorized vehicles, thus, a motorcycle powered by a hydrogen fuel cell has become an ideal green means of transportation.

The hydrogen fuel cell is based on the diffusion of hydrogen and oxygen in an electrolyte, and its dynamic response speed is related to its diffusion speed, so it is not suitable for applications with high frequency and large dynamic load changes. During use, the motorcycle needs to quickly respond to the use and provide electrical power, thus, in the early stage, the hydrogen fuel cell often functions insufficiently or slowly, but in the course, the running of the motorcycle on different roads will make many dynamic requirements for electrical energy, many requirements are therefore pot forward for the hydrogen fuel cell stack. For example, during running uphill, as the motor of the motorcycle needs high electrical energy, the output current of the hydrogen fuel cell will also change dynamically, easily resulting in damage to the hydrogen fuel cell stack and its overload.

As a result, the hydrogen fuel cell stacks is often paired with a lithium battery to constitute a hydrogen powered motorcycle. However, the existing hydrogen powered motorcycle is still dominated by the electrical energy of lithium batteries, without full utilization of hydrogen energy.

Accordingly, there remains a need for a power supply method and system for a hydrogen fuel cell stack, and a hydrogen powered motorcycle and a driving method and system thereof, which can effectively use the hydrogen fuel cell stack as the main power source, and the lithium battery as the secondary power source to supply power to the motorcycle.

BRIEF SUMMARY OF THE INVENTION

In order to overcome the above-mentioned technical defects, the purpose of the present invention is to provide a power supply method and system for a hydrogen fuel cell stack, and a hydrogen powered motorcycle and a driving method and system thereof, so as to use hydrogen energy as the electrical energy powering the motorcycle as much as possible under the protection of the hydrogen fuel cell stack.

The present invention discloses a power supply method for a hydrogen fuel cell stack, where a hydrogen fuel cell stack and a lithium battery pack are connected in parallel to an electric motor of a motorcycle, comprising following steps:

a control chip connected with the hydrogen fuel cell stack and the lithium battery pack detecting the operating states of the hydrogen fuel cell stack and the lithium batter/pack;

when the hydrogen fuel cell stack and the lithium battery pack are free of faults, the control chip obtaining the output voltage of the lithium battery pack, and comparing it with a preset charge-on threshold and charge-stop threshold;

when the output voltage is lower than the charge-on threshold, the hydrogen fuel cell stack powering the lithium battery pack;

when the output voltage is higher than the charge-stop threshold, disconnecting the circuit of the hydrogen fuel cell stack powering the lithium battery pack;

when the output voltage is more than or equal to the charge-on threshold and less than or equal to the charge-stop threshold, the circuit of the hydrogen fuel cell stack remaining to power the lithium battery pack;

when the hydrogen fuel cell stack remains to charge the lithium battery pack, controlling the hydrogen fuel cell stack to output a t-step output current to the lithium battery pack, where the output current of the n$^{th}$ step is $$I_n = n \cdot \frac{100\%}{t} \cdot I_{rated},$$

until the hydrogen fuel cell stack outputs a rated current to the lithium battery pack; and when the output voltage is higher than the charge-stop threshold, disconnecting the circuit of the hydrogen fuel cell stack powering the lithium battery pack.

Preferably, the operating state includes one or more of the residual quantity of electricity in the lithium battery pack, the residual quantity of electricity in the hydrogen fuel cell stack, the electrical connection state of the hydrogen fuel cell stack, the gas pressure of the hydrogen fuel cell stack, and the output voltage of the hydrogen fuel cell stack;

when the gas pressure of the hydrogen fuel cell stack is less than a pressure threshold, the control chip obtains information showing faults from the hydrogen fuel cell stack; and when there is essentially no output voltage from the hydrogen fuel cell stack, the control chip obtains information showing faults from the hydrogen fuel cell stack.

Preferably, the t-step output current has 4 steps, and the output current of $$I_n=n\cdot 25\%\cdot I_{rated}$$

the n$^{th}$ step is

Preferably, the method further includes the following steps:

the control chip being provided with a third voltage threshold;

when the output voltage of the lithium battery pack is less than the third voltage threshold, the lithium battery pack powering the motor and receiving electrical energy input by the hydrogen fuel cell stack within a first period of time, after the first period of time, the lithium battery pack stopping powering the motor, and then the hydrogen fuel cell stack powering the motor within a second period of time; and when the output voltage of the lithium battery pack is more than or equal to the third voltage threshold, the lithium battery pack powering the motor until the output voltage is less than the third voltage threshold.

The present invention further discloses a power supply system based on a hydrogen fuel cell stack, comprising: a hydrogen fuel cell stack, a lithium battery pack, a motorcycle motor, a control chip connected to the hydrogen fuel cell stack and the lithium battery pack, and the hydrogen fuel cell stack and the lithium battery pack being connected in parallel to the motor, the control chip detects the operating state of the hydrogen fuel cell stack and the lithium battery pack;

when the hydrogen fuel cell stack and the lithium battery pack are free of faults, the control chip obtains the output voltage of the lithium battery pack, and compares it with a preset charge-on threshold and charge-stop threshold;

when the output voltage is lower than the charge-on threshold, the hydrogen fuel cell stack powers the lithium battery pack;

when the output voltage is higher than the charge-stop threshold, the circuit of the hydrogen fuel cell stack powering the lithium battery pack is broken by the control chip;

when the output voltage is more than or equal to the charge-on threshold and less than or equal to the charge-stop threshold, the control chip keeps the circuit of the hydrogen fuel cell stack powering the lithium battery pack;

when the hydrogen fuel cell stack remains to charge the lithium battery pack, the hydrogen fuel cell stack is controlled to output a t-step output current to the lithium battery pack, where the output current of the $n^{th}$ step is $$I_n = n \cdot \frac{100\%}{t} \cdot I_{rated},$$

until the hydrogen fuel cell stack outputs a rated current to the lithium battery pack; and when the output voltage is higher than the charge-stop threshold, the circuit of the hydrogen fuel cell stack powering the lithium battery pack is broken by the control chip.

Preferably, the control chip is provided with a third voltage threshold;

when the output voltage of the lithium battery pack is less than the third voltage threshold, the lithium battery pack powers the motor and receives electrical energy input by the hydrogen fuel cell stack within a first period of time, after the first period of time, the lithium battery pack stops powering the motor, and then the hydrogen fuel cell stack powers the motor within a second period of time; and when the output voltage of the lithium battery pack is more than or equal to the third voltage threshold, the lithium battery pack powers the motor until the output voltage is less than the third voltage threshold.

The present invention further discloses a driving method of a hydrogen powered motorcycle, comprising the following steps:

a control chip inside a hydrogen powered motorcycle detecting the operating state of a hydrogen fuel cell stack and a lithium battery pack;

when the hydrogen fuel cell stack and the lithium battery pack are free of faults, the control chip obtaining the output voltage of the lithium battery pack, and comparing it with a preset charge-on threshold and charge-stop threshold;

when the output voltage is lower than the charge-on threshold, the hydrogen fuel cell stack powering the lithium battery pack;

when the output voltage is higher than the charge-stop threshold, disconnecting the circuit of the hydrogen fuel cell stack powering the lithium battery pack;

when the output voltage is more than or equal to the charge-on threshold and less than or equal to the charge-stop threshold, the circuit of the hydrogen fuel cell stack remaining to power the lithium battery pack;

when the hydrogen fuel cell stack remains to charge the lithium battery pack, controlling the hydrogen fuel cell stack to output a t-step output current to the lithium battery pack, where the output current of the $n^{th}$ step is $$I_n = n \cdot \frac{100\%}{t} \cdot I_{rated},$$

until the hydrogen fuel cell stack outputs a rated current to the lithium battery pack;

when the output voltage is higher than the charge-stop threshold, disconnecting the circuit of the hydrogen fuel cell stack powering the lithium battery pack; and the lithium battery pack powering the motor and receiving electrical energy input by the hydrogen fuel cell stack within a first period of time, after the first period of time, the lithium battery pack stopping powering the motor, and then the hydrogen fuel cell stack powering the motor within a second period of time.

The present invention further discloses a driving system of a hydrogen powered motorcycle, comprising a hydrogen fuel cell stack, a lithium battery pack, an electric motor, a control chip connected to the hydrogen fuel cell stack and the lithium battery pack, and the hydrogen fuel cell stack and the lithium battery pack being connected in parallel to the motor, the control chip detects the operating state of the hydrogen fuel cell stack and the lithium battery pack;

when the hydrogen fuel cell stack and the lithium battery pack are free of faults, the control chip obtains the output voltage of the lithium battery pack, and compares it with a preset charge-on threshold and charge-stop threshold;

when the output voltage is lower than the charge-on threshold, the hydrogen fuel cell stack powers the lithium battery pack;

when the output voltage is higher than the charge-stop threshold, the circuit of the hydrogen fuel cell stack powering the lithium battery pack is broken by the control chip;

when the output voltage is more than or equal to the charge-on threshold and less than or equal to the charge-stop threshold, the control chip keeps the circuit of the hydrogen fuel cell stack powering the lithium battery pack;

when the hydrogen fuel cell stack remains to charge the lithium battery pack, the hydrogen fuel cell stack is controlled to output a t-step output current to the lithium battery pack, where the output current of the $n^{th}$ step is $$I_n = n \cdot \frac{100\%}{t} \cdot I_{rated},$$

until the hydrogen fuel cell stack outputs a rated current to the lithium battery pack;

when the output voltage is higher than the charge-stop threshold, the circuit of the hydrogen fuel cell stack powering the lithium battery pack is broken by the control chip; and the lithium battery pack powers the motor and receives electrical energy input by the hydrogen fuel cell stack within a first period of time, after the first period of time, the lithium battery pack stops powering the motor, and then the hydrogen fuel cell stack powers the motor within a second period of time.

The present invention also discloses a hydrogen powered motorcycle, comprising the driving system as described above.

Compared with the prior art, the above-mentioned technical solution has the following beneficial effects:

1. When starting to use the motorcycle, in order to protect the hydrogen fuel cell stack, the lithium battery powers the motorcycle, so that the user can also feel the motive force during the initial use.

2. The residual amount of hydrogen can be effectively and indirectly detected with low costs and high conversion rates.

DETAILED DESCRIPTION OF THE INVENTION

Figure 1:
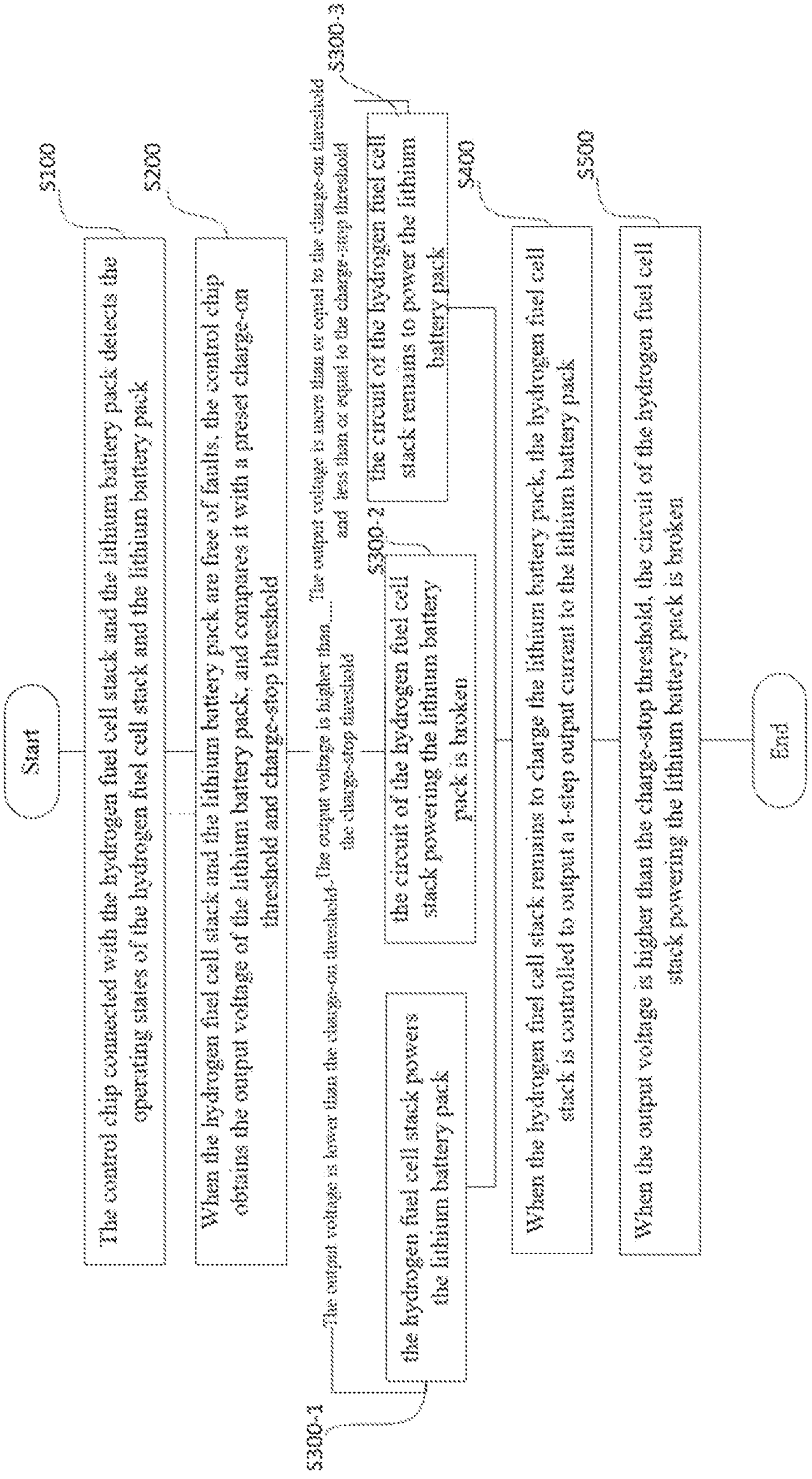
FIG. 1 is a schematic flowchart of the power supply method for a hydrogen fuel cell stack in accordance with a preferred embodiment of the present invention.

The advantages of the present invention are further described below in combination with the drawings and specific embodiments.

Exemplary examples will be described herein in detail, and the typical example thereof presents in the drawings. When the following description refers to the drawings, unless otherwise indicated, the same numbers in different drawings indicate the same or similar elements. The embodiments described in the following exemplary examples do not represent all embodiments consistent with the present disclosure. On the contrary, they are merely examples of the device and the method consistent with some aspects of the present disclosure as detailed in the appended claims.

The terms used in the present disclosure are only for the purpose of describing specific examples, not intended to limit the present disclosure. The singular of “a”, “said” and “the” used in the present disclosure and appended claims is also intended to include plural, unless other meanings mentioned above and below are dearly indicated. It should also be understood that the term “and/or” used herein refers to any or all possible combinations incorporating one or more associated listed items.

It should be understood that although the terms such as first, second, third and the like may be used in the present disclosure to describe various information, these information should not be limited to these terms. These terms are only used to distinguish identical kinds of information from each other. For example, within the present disclosure, a first information may also be referred to as a second information, similarly, a second information may also be referred to as a first information. According to the context, the word “if” as used herein can be interpreted as “when” or “in the case that” or “depending on”.

In the description of the present invention, it should be understood that the terms such as “longitudinal”, “ transverse”, “upper”, “lower”, “front”, “rear”, “left”, “right”, “vertical”, “horizontal”, “top”, “bottom”, “inner”, “outer” and the like indicating orientational or positional relations are based on the orientational or positional relations shown in the drawings, only for the convenience of describing the present invention and simplifying the description, instead of indicating or implying that the pointed device or element must have a specific orientation, and be arranged and operated in a specific orientation, therefore they cannot be understood as limitations imposed on the present invention.

In the invention, unless otherwise clearly defined and limited, it should be noted that the terms such as “installation”, “connection”, “interconnection ” should be construed broadly. For example, it may be a a mechanical connection or an electrical connection, it may be an internal passage between two components, it may be a direct connection, or an indirect connection through an intermediate medium, a person skilled in the art can understand the specific meaning of the above-mentioned terms in the invention according to specific circumstances.

In the following description, the suffixes such as “module”, “part” or “unit” used to indicate elements are only for the convenience of describing the present invention, and have no specific meaning in themselves. Therefore, “modules” and “parts” can be commingled for use.

Referring to FIG. 1, which is a schematic flowchart of the power supply method for a hydrogen fuel cell stack in accordance with a preferred embodiment of the present invention, in this example, the hydrogen fuel cell used as a power source is connected in parallel with a lithium battery also used as a power source, and together with the latter connected to the electric motor of the motorcycle. After connecting the electric motor in parallel with the electrical energy generating element of the hydrogen fuel cell, that is, the hydrogen fuel cell stack and the lithium battery, we shall integrate electronics into a control chip, an integrated circuit or a circuit board through a circuit, for example, the electronics on the circuit board will control the charging and discharging of the hydrogen fuel cell stack and the lithium battery, respectively, and control the output voltage and output current powering the motor from the hydrogen fuel cell stack and the lithium battery. We can realize powering the motor from the hydrogen fuel cell stack and the lithium battery pack by executing the following steps:

S100: The control chip connected with the hydrogen fuel cell stack and the lithium battery pack detects the operating states of the hydrogen fuel cell stack and the lithium battery pack.

The control chip (or integrated circuit or circuit board in different embodiments) will detect the operating states of the hydrogen fuel cell stack and the lithium battery pack in real time and periodically before activating the hydrogen fuel cell stack and the lithium battery pack and during operation, for example, the working state may be one or more of the residual quantity of electricity in the lithium battery pack, the residual quantity of electricity in the hydrogen fuel cell stack, the electrical connection state of the hydrogen fuel cell stack, the gas pressure of the hydrogen fuel cell stack, and the output voltage of the hydrogen fuel cell stack. Its acquisition means may be to provide or integrate the control chip with a sensor group. Among them, the residual quantity of electricity in the lithium battery pack may be presented in percentage; the residual quantity of electricity in the hydrogen fuel cell stack may be presented in percentage; the electrical connection state of the hydrogen fuel cell stack may be normal connection, disconnection, overload connection and the like; the gas pressure of the hydrogen fuel cell stack may be presented or informed in percentage.

S200: When the hydrogen fuel cell stack and the lithium battery pack are free of faults, the control chip obtains the output voltage of the lithium battery pack, and compares it with a preset charge-on threshold and charge-stop threshold.

While the control chip is detecting the hydrogen fuel cell stack and the lithium battery pack, and the detected results are free of faults, after the control chip collects the output voltage of the lithium battery pack, the output voltage is compared with the charge-on threshold and charge-stop threshold preset in the control chip. In this embodiment, it is taken as an example that the control chip detects the residual quantity of electricity in the lithium battery pack, the residual quantity of electricity in the hydrogen fuel cell stack, the electrical connection state of the hydrogen fuel cell stack, the gas pressure of the hydrogen fuel cell stack, and the output voltage of the hydrogen fuel cell stack. In the case that the residual quantity of electricity in the lithium battery pack is more than a lower limit of quantity of electricity, such as 5%, 10%, 15%, and so forth, the lithium battery pack is deemed to be free of faults. In the case that the residual quantity of electricity in the hydrogen fuel cell stack is more than a lower limit of quantity of electricity, such as 5%, 10%, 15%, and so forth, the hydrogen fuel cell stack is deemed to be free of faults. In the case that the electrical connection state of the hydrogen fuel cell stack is in normal connection, disconnection, overload connection and the like, the hydrogen fuel cell stack is deemed to be free of faults. In the case that the gas pressure of the hydrogen fuel cell stack is more than a lower limit of pressure, such as 10%, 20%, 30% of full pressure, the hydrogen fuel cell stack is deemed to be free of faults, In the case that the output voltage of the hydrogen fuel cell stack is more than a lower limit of output voltage, the hydrogen fuel cell stack is deemed to be free of faults. When it is determined that the hydrogen fuel cell stack and lithium battery pack are free of faults, we can carry out the subsequent utilization of the hydrogen fuel cell stack and lithium battery pack to power the motorcycle. In this case, the control chip will specifically obtain the output voltage of the lithium battery pack, the charge-on threshold and the charge-stop threshold to determine whether the lithium battery pack needs to be charged, so as to make different charging and discharging processes.

Similarly, if the gas pressure of the hydrogen fuel cell stack is less than a pressure threshold, namely, a lower limit of pressure, or the output voltage of the hydrogen fuel cell stack is less than a lower limit of output voltage, or there is essentially no output voltage, the control chip will take the hydrogen fuel cell stack as the one with fault information and state.

S300-1: When the output voltage is lower than the charge-on threshold, the hydrogen fuel cell stack powers the lithium battery pack.

After the control chip obtains the output voltage of the lithium battery pack, the output voltage becomes lower than the charge-on threshold, such as 36.5V, indicating less quantity of electricity in the lithium battery pack and disability to output sufficient output voltage. Therefore, the hydrogen fuel cell stack will first output electrical energy to the lithium battery pack after degassing the hydrogen gas, ensuring work normal operation and enabling to output electrical energy, next charge the lithium battery pack when powering the lithium battery pack, so as to increase the residual quantity of electricity in the lithium battery pack. in the case the control chip detects the output voltage of the lithium battery pack and the output voltage becomes lower than the charge-on threshold, the hydrogen fuel cell stack will activate the function of the hydrogen fuel cell stack to output electrical energy when failing to power the lithium battery pack. if the hydrogen fuel cell stack has output electrical energy to the lithium battery pack, it remains the preservation of the charging circuit.

S300-2: When the output voltage is higher than the charge-stop threshold, the circuit of the hydrogen fuel cell stack powering the lithium battery pack is broken.

After the control chip obtains the output voltage of the lithium battery pack, the output voltage becomes higher than the charge-stop threshold, such as 40.5V, indicating more quantity of electricity in the lithium battery pack and ability to output sufficient output voltage. Therefore, the hydrogen fuel cell stack will stop outputting electrical energy to the lithium battery pack after degassing the hydrogen gas, ensuring work normal operation and enabling to output electrical energy, so as to prevent dangerous situations from overcharging the lithium battery pack. In the case the control chip detects the output voltage of the lithium battery pack and the output voltage is higher than the charge-stop threshold, it will maintain the function of the hydrogen fuel cell stack to suspend outputting electrical energy. If the hydrogen fuel cell stack has output electrical energy to the lithium battery pack, it remains to disconnect the charging circuit.

S300-3: When the output voltage is more than or equal to the charge-on threshold and less than or equal to the charge-stop threshold, the circuit of the hydrogen fuel cell stack remains to power the lithium battery pack.

After the control chip obtains the output voltage of the lithium battery pack, the output voltage becomes more than or equal to the charge-on threshold and less than or equal to the charge-stop threshold , such as, ranging from 36.5V to 40.5V, indicating that the electrical energy in the lithium battery pack is moderate, and remains its rechargeable and dischargeable state. Therefore, the circuit of the hydrogen fuel cell stack remains to power the lithium battery pack, that is, in the case that the hydrogen fuel cell stack charges the lithium battery pack during detection, it will maintain the charging state of the charging circuit; in the case that the hydrogen fuel cell stack does not charge the lithium battery pack during detection, it will maintain the suspended charging state of the charging circuit.

S400: When the hydrogen fuel cell stack remains to charge the lithium battery pack, the hydrogen fuel cell stack is controlled to output a t-step output current to the lithium battery pack.

In the above-mentioned example, in the case that the circuit of the hydrogen fuel cell stack charging the lithium battery pack remains a charged state, it indicates that the electrical energy of the lithium battery pack is insufficient, and some part of the electrical energy generated by the hydrogen fuel cell stack is delivered to the lithium battery pack. At starting to charge and during charging, under the control of the control chip, the hydrogen fuel cell stack does not output 100% of the output current to the lithium battery pack at one time, instead outputs the t-step output current step by step, and charges the lithium battery pack with step-by-step enhancement. Such a configuration is provided, on the one hand, for the hydrogen fuel cell stack to consider that after generating electrical energy a buffer period is required to gradually increase the output voltage to the rated voltage; on the other hand, for the lithium battery pack to consider that it is likely to cause its high current to be in overload and overcurrent, therefore, the step-by-step mode is adopted to charge the lithium battery pack. Specifically, the current output at each step is:

$$I_n = n \cdot \frac{100\%}{t} \cdot I_{rated},$$

where $I_n$ is the current output at the $n^{th}$ step, $I_{rated}$ is the maximum current that can be output by the hydrogen fuel cell stack, t is the number of steps in different embodiments, if larger the value of t, more the number of divided steps, vice versa, and $1 \leq n \leq t$. For example, $$I_1 = \frac{100\%}{t} \cdot I_{rated},\ I_2 = 2 \cdot \frac{100\%}{t} \cdot I_{rated},\ I_3 = 3 \cdot \frac{100\%}{t} \cdot I_{rated},$$

every increased currents between adjacent steps are equal, so that the output currents at each step are an arithmetic sequence. For example, in a preferred example, the output current in the step-by-step mode is divided into 4 steps, and the output current of the $n^{th}$ step is $I_n = n \cdot 25\% \cdot I_{rated}$.

It can be understood that, in the conventional solution, during initial discharge control to the hydrogen fuel cell stack, the output current is to be controlled according to the degassing rate of hydrogen and the residual amount of hydrogen, but this needs to add a pressure sensor to the hydrogen cylinders of the hydrogen fuel cell stack. Normally, this pressure sensor is expensive, and its use is only limited to the pressure detection of gas, so its function is not indispensable. The output current in the step-by-step mode can be used to estimate the residual amount of hydrogen by means of the percentage of the actual output current accounting for the maximum output current, that is, the adoption of the output current in the step-by-step mode will enable to omit the installation of gas sensors and save costs.

S500: When the output voltage is higher than the charge-stop threshold, the circuit of the hydrogen fuel cell stack powering the lithium battery pack is broken.

When the hydrogen fuel cell stack continues to charge the lithium battery pack, the residual quantity of electricity in the lithium battery pack will gradually increase, so that the output voltage that can be output by the lithium battery pack will gradually increase. While the control chip is continuously monitoring the lithium battery pack, in the case that the output voltage of the lithium battery pack is higher than the charge-stop threshold after charged, indicating sufficient residual quantity of electricity of the lithium battery pack and no need to charge, the control chip will control to disconnect the circuit of the hydrogen fuel cell stack powering the lithium battery pack.

Through the above configuration, the hydrogen powered motorcycle is provided with dual power sources, in which the hydrogen fuel cell stack is mainly used to power the motor of the motorcycle, and the surplus power will be supplied to the lithium battery pack to improve the battery life. On the contrary, if the hydrogen fuel cell stack just starts, but cannot fully output current, the lithium battery pack will first power the motor. The coordination between the hydrogen fuel cell stack and the lithium battery pack enables the hydrogen powered motorcycle to be driven by users anytime, anywhere.

Figure 2:
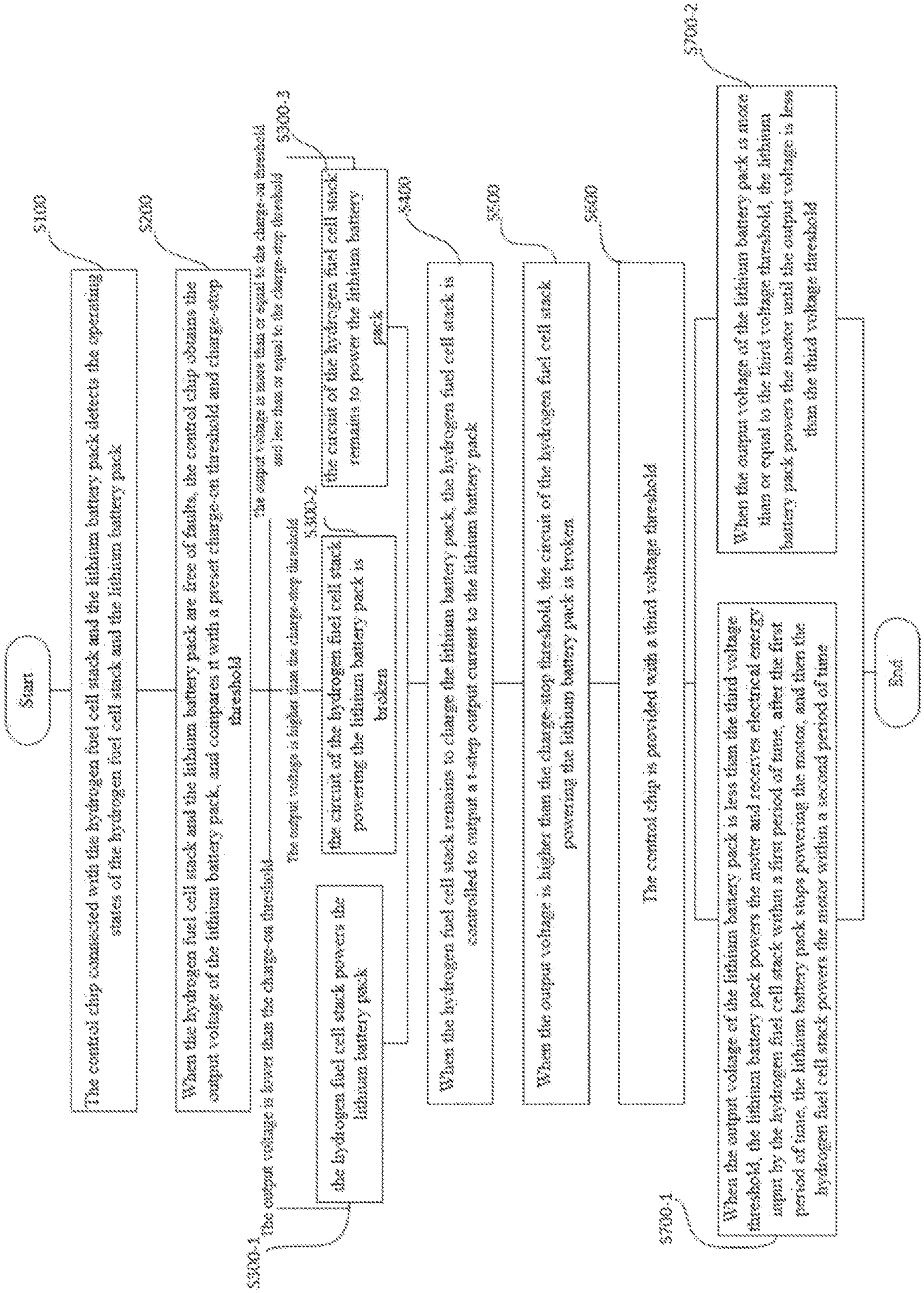
FIG. 2 is a schematic flowchart of the power supply method for a hydrogen fuel cell stack in accordance with another preferred embodiment of the present invention.

Referring to FIG. 2, in a preferred embodiment, the power supply method further includes the following steps:

S600: The control chip is further provided with a third voltage threshold, which is used to determine where the source of power derives from at starting of the hydrogen powered motorcycle (for example, when the user needs to drive the motorcycle after riding it).

S700-1: When the output voltage of the lithium battery pack is less than the third voltage threshold, the lithium battery pack powers the motor and receives electrical energy input by the hydrogen fuel cell stack within a first period of time, after the first period of time, the lithium battery pack stops powering the motor, and then the hydrogen fuel cell stack powers the motor within a second period of time.

While the control chip is continuously monitoring the output voltage of the lithium battery pack by, in the case that the output voltage of the lithium battery pack is less than the third voltage threshold, indicating less residual quantity of electricity in the lithium battery pack, within a preset first period of time, such as 2 minutes, 3 minutes, 5 minutes, and so forth, the control chip controls the function of powering the motor from the lithium battery pack, instead of the hydrogen fuel cell stack, and controls the current output by the hydrogen fuel cell stack to supply to the lithium battery pack, that is, the lithium battery pack is both in a charging state and a discharging state. One reason for this configuration is that when the hydrogen fuel cell stack just starts, the output voltage may be low, not suitable for the operation of the motor, in order not to waste these electrical energy, this part of electrical energy will be delivered to the lithium battery pack, which can output the output voltage (such as about 36V) directly used for the motor. After the first period of time, the hydrogen fuel cell stack has been fully actuated and can output the required output voltage directly applied to the motor, and as for the hydrogen powered motorcycle, just as its name implies, the source of energy powering the motorcycle derives from the hydrogen fuel cell stack, that is, the lithium battery is controlled by the control chip, and stops powering the motor, instead the hydrogen fuel cell stack powers the motor, wherein the time length for such powering process can last for the second period of time, which can be a fixed time length, such as 20 minutes, 30 minutes, and so forth, which is a total time length during which the hydrogen fuel cell stack can output constant pressure after a motorcycle maker has tested the total amount of hydrogen. Or, during monitoring the residual amount of hydrogen, when the residual amount is less than a threshold value, the control chip cuts off the circuit of the hydrogen fuel cell stack powering the motor.

S700-2: When the output voltage of the lithium battery pack is more than or equal to the third voltage threshold, the lithium battery pack powers the motor until the output voltage is less than the third voltage threshold.

While the control chip is continuously monitoring the output voltage of the lithium battery pack by, in the case that the output voltage of the lithium battery pack is more than or equal to the third voltage threshold, indicating more and sufficient residual quantity of electricity in the lithium battery pack, the lithium battery pack does not need to get charged, that is, the lithium battery pack is only in a discharging state, continuously powering the motor. When the lithium battery pack has been powered for the first period of time or continues discharging, the residual quantity of electricity inside it decreases, resulting in a decrease in the output voltage. Until the output voltage reaches the third voltage threshold, the control chip does not detect this condition, and then activates the circuit of the hydrogen fuel cell stack charging the lithium battery pack.

In this embodiment, the lithium battery pack is intelligently paired with the hydrogen fuel cell stack, on the one hand, to make a smooth transition through such buffer period for hydrogen release as prevent users from feeling motive force during an initial drive, on the other hand, to spend the buffer period for hydrogen release, so as to fully utilize the hydrogen fuel cell stack to facilitate user's travel with clean energy.

Figure 3:
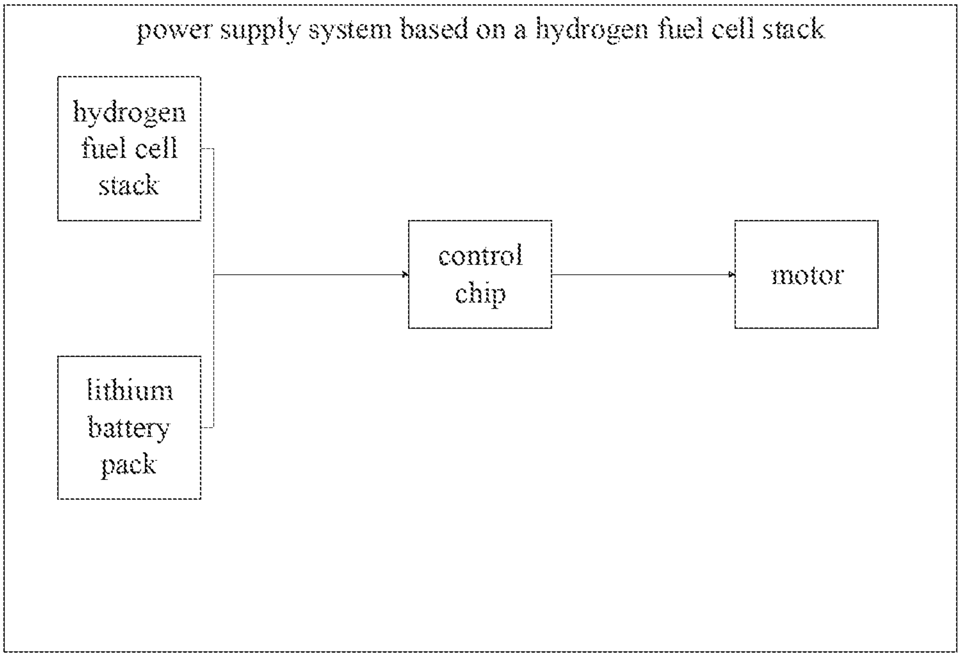
FIG. 3 is a structure diagram of the power supply system for a hydrogen fuel cell stack in accordance with a preferred embodiment of the present invention.

Referring to FIG. 3, a power supply system based on a hydrogen fuel cell stack is shown, including a hydrogen fuel cell stack, a lithium battery pack, a motorcycle motor, and a control chip connected to the hydrogen fuel cell stack and the lithium battery pack. The hydrogen fuel cell stack and the lithium battery pack are connected in parallel to the motor, and the control chip detects the operating state of the hydrogen fuel cell stack and the lithium battery pack. When the hydrogen fuel cell stack and the lithium battery pack are free of faults, the control chip obtains the output voltage of the lithium battery pack, and compares it with a preset charge-on threshold and charge-stop threshold, When the output voltage is lower than the charge-on threshold, the hydrogen fuel cell stack powers the lithium battery pack. When the output voltage is higher than the charge-stop threshold, the circuit of the hydrogen fuel cell stack powering the lithium battery pack is broken by the control chip. When the output voltage is more than or equal to the charge-on threshold and less than or equal to the charge-stop threshold, the control chip keeps the circuit of the hydrogen fuel cell stack powering the lithium battery pack. When the hydrogen fuel cell stack remains to charge the lithium battery pack, the hydrogen fuel cell stack is controlled to output a t-step output current to the lithium battery pack, where the output current of the $n^{th}$ step is $$I_n = n \cdot \frac{100\%}{t} \cdot I_{rated},$$

until the hydrogen fuel cell stack outputs the rated current to the lithium battery pack. When the output voltage is higher than the charge-stop threshold, the circuit of the hydrogen fuel cell stack powering the lithium battery pack is broken by the control chip.

In a preferred embodiment, the control chip is provided with a third voltage threshold. When the output voltage of the lithium battery pack is less than the third voltage threshold, the lithium battery pack powers the motor and receives electrical energy input by the hydrogen fuel cell stack within a first period of time, after the first period of time, the lithium battery pack stops powering the motor, and then the hydrogen fuel cell stack powers the motor within a second period of time. When the output voltage of the lithium battery pack is more than or equal to the third voltage threshold, the lithium battery pack powers the motor until the output voltage is less than the third voltage threshold.

Figure 4:
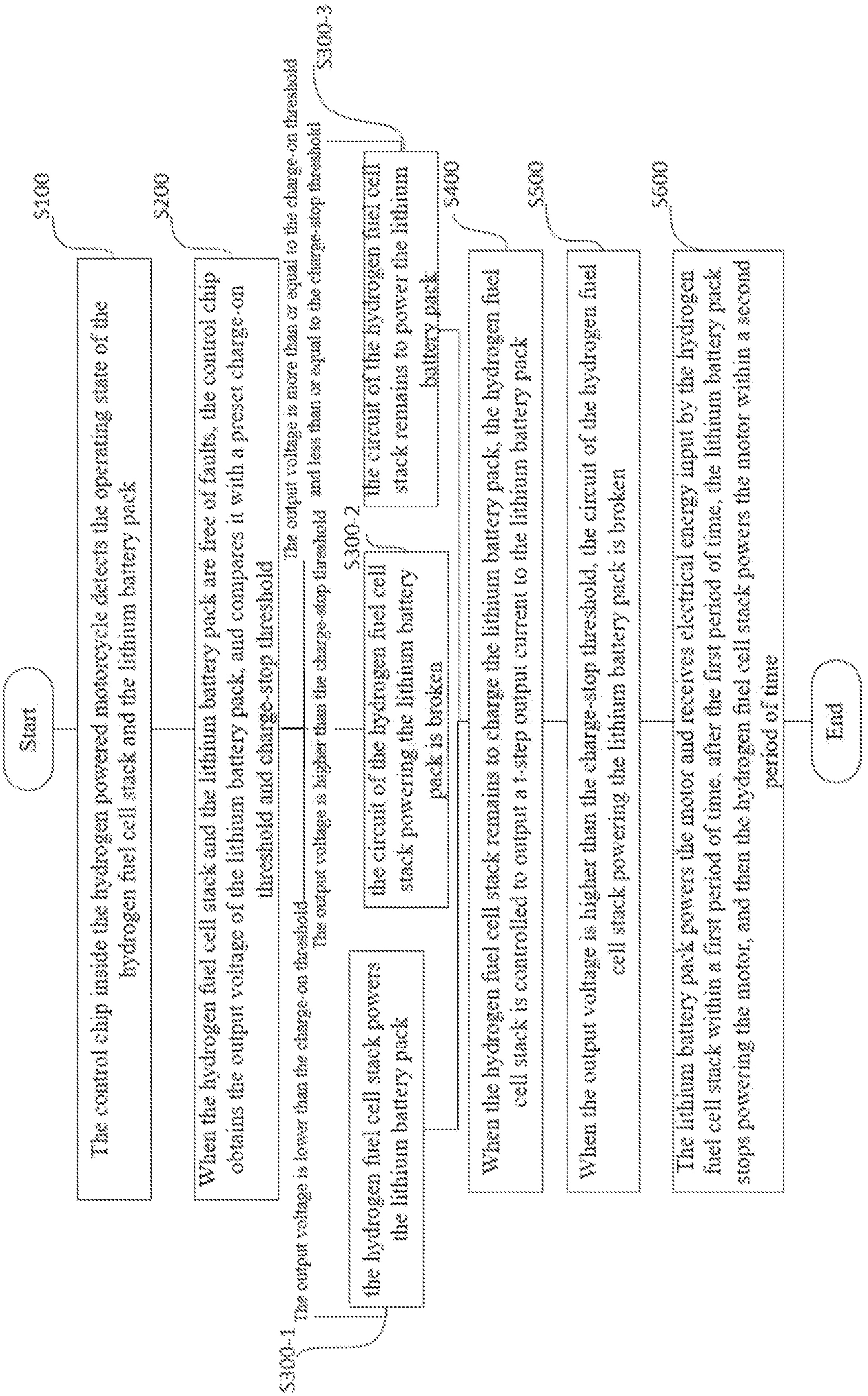
FIG. 4 is a schematic flowchart of the driving method of the hydrogen powered motorcycle in accordance with a preferred embodiment of the present invention.

Referring to FIG. 4, a driving method of a hydrogen powered motorcycle is shown, including the following steps:

S100: The control chip inside the hydrogen powered motorcycle detects the operating state of the hydrogen fuel cell stack and the lithium battery pack.

S200: When the hydrogen fuel cell stack and the lithium battery pack are free of faults, the control chip obtains the output voltage of the lithium battery pack, and compares it with a preset charge-on threshold and charge-stop threshold.

S300-1: When the output voltage is lower than the charge-on threshold, the hydrogen fuel cell stack powers the lithium battery pack.

S300-2: When the output voltage is higher than the charge-stop threshold, the circuit of the hydrogen fuel cell stack powering the lithium battery pack is broken.

S300-3: When the output voltage is more than or equal to the charge-on threshold and less than or equal to the charge-stop threshold, the circuit of the hydrogen fuel cell stack remains to power the lithium battery pack.

S400: When the hydrogen fuel cell stack remains to charge the lithium battery pack, the hydrogen fuel cell stack is controlled to output a t-step output current to the lithium battery pack, where the output current of the $n^{th}$ step is $$I_n = n \cdot \frac{100\%}{t} \cdot I_{rated},$$

until the hydrogen fuel cell stack outputs the rated current to the lithium battery pack.

S500: When the output voltage is higher than the charge-stop threshold, the circuit of the hydrogen fuel cell stack powering the lithium battery pack is broken.

S600: The lithium battery pack powers the motor and receives electrical energy input by the hydrogen fuel cell stack within a first period of time, after the first period of time, the lithium battery pack stops powering the motor, and then the hydrogen fuel cell stack powers the motor within a second period of time.

Figure 5:
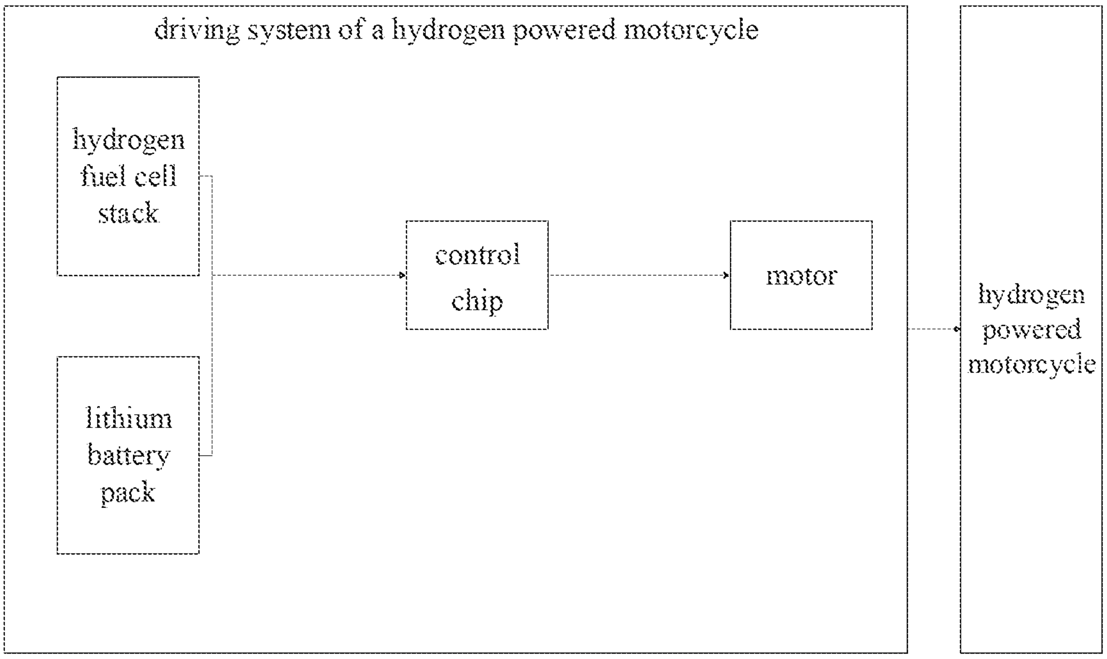
FIG. 5 is a structure diagram of the driving system of the hydrogen powered motorcycle in accordance with a preferred embodiment of the present invention.

Referring to FIG. 5, a driving system of a hydrogen powered motorcycle is shown, including a hydrogen fuel cell stack, a lithium battery pack, an electric motor, and a control chip connected to the hydrogen fuel cell stack and the lithium battery pack. The hydrogen fuel cell stack and the lithium battery pack are connected in parallel to the motor, and the control chip detects the operating state of the hydrogen fuel cell stack and the lithium battery pack. When the hydrogen fuel cell stack and the lithium battery pack are free of faults, the control chip obtains the output voltage of the lithium battery pack, and compares it with a preset charge-on threshold and charge-stop threshold. When the output voltage is lower than the charge-on threshold, the hydrogen fuel cell stack powers the lithium battery pack, When the output voltage is higher than the charge-stop threshold, the circuit of the hydrogen fuel cell stack powering the lithium battery pack is broken by the control chip. When the output voltage is more than or equal to the charge-on threshold and less than or equal to the charge-stop threshold, the control chip keeps the circuit of the hydrogen fuel cell stack powering the lithium battery pack. When the hydrogen fuel cell stack remains to charge the lithium battery pack, the hydrogen fuel cell stack is controlled to output a t-step output current to the lithium battery pack, where the output current of the $n^{th}$ step is $$I_n = n \cdot \frac{100\%}{t} \cdot I_{rated},$$

until the hydrogen fuel cell stack outputs the rated current to the lithium battery pack. When the output voltage is higher than the charge-stop threshold, the circuit of the hydrogen fuel cell stack powering the lithium battery pack is broken by the control chip. The lithium battery pack powers the motor and receives electrical energy input by the hydrogen fuel cell stack within a first period of time, after the first period of time, the lithium battery pack stops powering the motor, and then the hydrogen fuel cell stack powers the motor within a second period of time.

The driving system can be directly applied to a hydrogen powered motorcycle.

It should be noted that the embodiments of the present invention are better put into practice, and do not impose any limitation on the present invention, and any person skilled in the art may change or modify the aforementioned technical contents into equivalent effective embodiments. However, any amendments or equivalent changes and modifications made to the aforementioned embodiments according to the technical essence of the present invention without departing from the content of the technical solutions of the present invention still fall within the scope of the technical solutions of the present invention.

What is claimed is:

1. A power supply method for a hydrogen fuel cell stack, where a hydrogen fuel cell stack and a lithium battery pack are connected in parallel to an electric motor of a motorcycle, wherein the hydrogen fuel cell stack is used as the main power source for the motorcycle motor, and the lithium battery pack is used as the secondary power source, to use hydrogen energy as the electrical energy powering the motorcycle as much as possible under the protection of the hydrogen fuel cell stack. and wherein the method is used to adapt to dynamic load changes of the motorcycle during running, including uphill, start and acceleration conditions, so as to avoid overload and damage of the hydrogen fuel cell stack caused by dynamic electrical energy requirements comprising following steps:

a control chip connected with said hydrogen fuel cell stack and said lithium battery pack detecting the operating states of said hydrogen fuel cell stack and said lithium battery pack, wherein the operating state includes one or more of the residual quantity of electricity in the lithium battery pack, the residual quantity of electricity in the hydrogen fuel cell stack, the electrical connection state of the hydrogen fuel cell stack, the gas pressure of the hydrogen fuel cell stack, and the output voltage of the hydrogen fuel cell stack: when the gas pressure of the hydrogen fuel cell stack is less than a pressure threshold, or when there is essentially no output voltage from the hydrogen fuel cell stack, the control chip obtains fault information of the hydrogen fuel cell stack;

when said hydrogen fuel cell stack and said lithium battery pack are free of faults, said control chip obtaining the output voltage of said lithium battery pack, and comparing it with a preset charge-on threshold and charge-stop threshold;

when said output voltage is lower than said charge-on threshold, said hydrogen fuel cell stack powering said lithium battery pack;

when said output voltage is higher than said charge-stop threshold, disconnecting the circuit of said hydrogen fuel cell stack powering said lithium battery pack;

when said output voltage is more than or equal to said charge-on threshold and less than or equal to said charge-stop threshold, the circuit of said hydrogen fuel cell stack remaining to power said lithium battery pack; and when said hydrogen fuel cell stack remains to charge said lithium battery pack, controlling said hydrogen fuel cell stack to output a t-step output current to said lithium battery pack, where the output current of the $n^{th}$ step is $$I_n = n \cdot \frac{100\%}{t} \cdot I_{rated},$$

until said hydrogen fuel cell stack outputs a rated current to said lithium battery pack, where $1 \leq n \leq t$, wherein the t-step output current is used to provide a buffer period for the hydrogen fuel cell stack to gradually increase the output voltage to the rated voltage, avoid overload and overcurrent of the lithium battery pack, and estimate the residual amount of hydrogen in the hydrogen fuel cell stack without an additional gas pressure sensor; and when starting the motorcycle, the lithium battery pack preferentially powers the motorcycle motor to provide initial motive force for the user while protecting the hydrogen fuel cell stack.

2. The power supply method according to claim 1, wherein said t-step output current has 4 steps, and the output current of the $n^{th}$ step is $I_n = n \cdot 25\% \cdot I_{rated}$, where $1 \leq n \leq 4$.

3. The power supply method according to claim 1, wherein said method further includes the following steps:

said control chip being provided with a third voltage threshold;

when the output voltage of said lithium battery pack is less than said third voltage threshold, said lithium battery pack powering said motor and receiving electrical energy input by said hydrogen fuel cell stack within a first period of time, after said first period of time, said lithium battery pack stopping powering said motor, and then said hydrogen fuel cell stack powering said motor within a second period of time; and when the output voltage of said lithium battery pack is more than or equal to said third voltage threshold, said lithium battery pack powering said motor until said output voltage is less than said third voltage threshold.

* * * * *